UNITED STATES PATENT OFFICE.

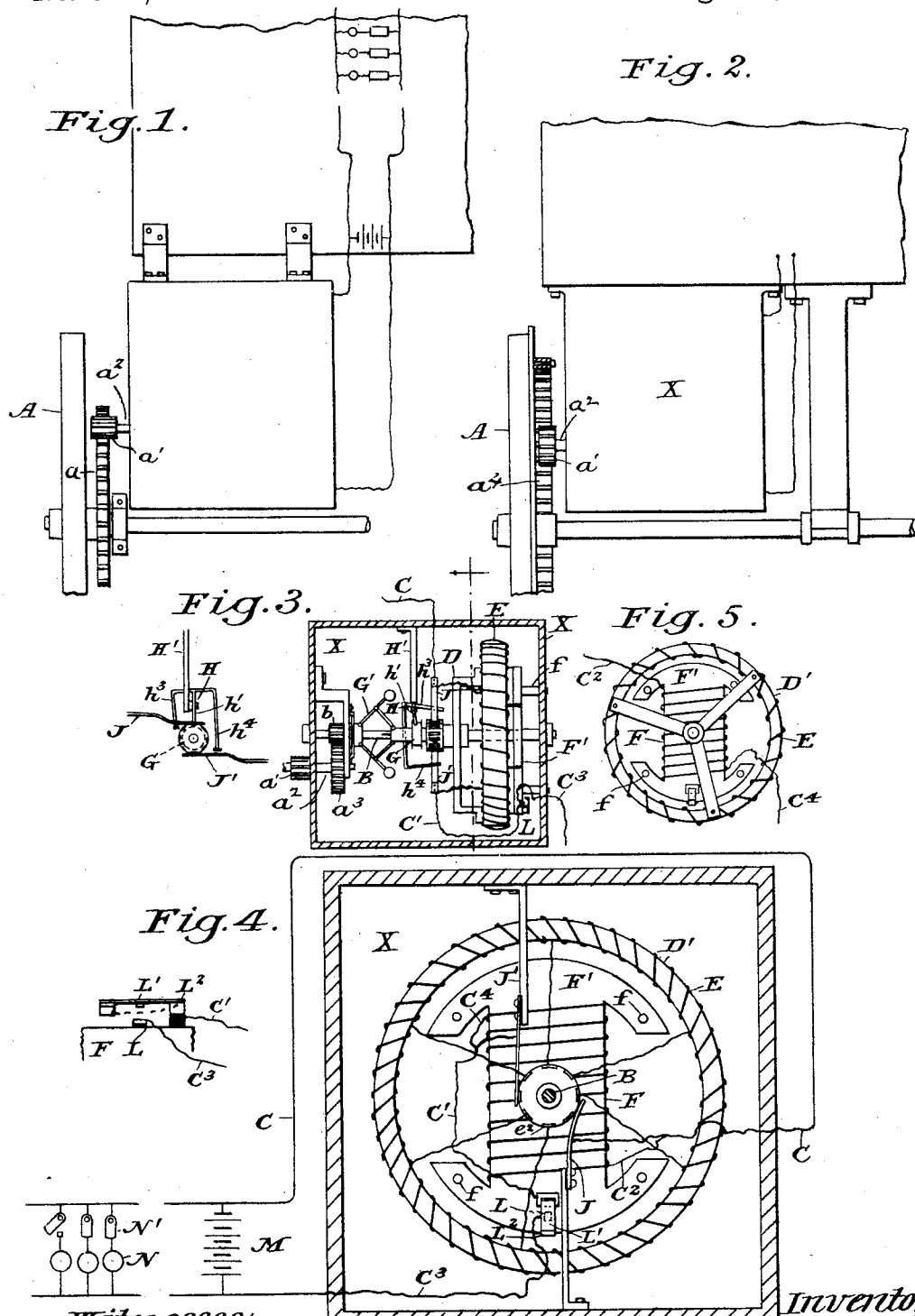

FREDERICK M. BENNETT, OF NEW YORK, N. Y., ASSIGNOR OF ONE-HALF TO ADOLPH A. BERLE.

ELECTRIC CAR-LIGHTING SYSTEM.

SPECIFICATION forming part of Letters Patent No. 589,112, dated August 31, 1897.

Application filed January 4, 1897. Serial No. 617,893. (No model.)

*To all whom it may concern:*

Be it known that I, FREDERICK M. BENNETT, a citizen of the United States, and a resident of New York, in the county and State of New York, have invented a certain new and useful Electric-Lighting System, of which the following is a specification.

My invention relates to an electric organization in which the electric energy or lighting agent is obtained from a dynamo actuated by a variable-speed power, as a vehicle, and has for its object the provision of an apparatus of the class described, in combination with secondary or storage batteries, the whole being simple in construction, inexpensive to manufacture, and efficient in practical use.

In order to obtain the desired end, this my invention consists in the construction, arrangement, and operation of parts herein set forth.

In the drawings which accompany and form a part of this specification, Figures 1 and 2 represent partial elevations of vehicles provided with my electric-lighting system. Fig. 3 is a view in detail showing an elevation of the mechanism within the interior of my dynamo-casing, and Figs. 4 and 5 are diagrammatic views of my electric circuit and dynamo coils and connections.

Like letters of reference indicate like parts in all the views.

I have found it desirable to provide a self-regulating dynamo actuated by a vehicle to practically maintain a normal electromotive force whether the speed of the vehicle be increased or diminished and to properly direct the current through the secondary battery or batteries employed in an electric-lighting system, and also to use in connection therewith a switching device whereby a change of direction of the current through the storage batteries is avoided upon the stoppage of the vehicle, and I have therefore constructed according to my invention an organization of the class described embodying the preferred construction of parts and their mutual relationship, combination, arrangement, and organization in a composite body or structure, as hereinafter described.

Referring particularly to the drawings, A denotes a wheel of a vehicle, to the hub of which may be attached a gear $a$, which meshes in a pinion $a'$ on a shaft $2^2$, which also carries a gear $a^3$, which actuates a pinion $b$ of my dynamo-shaft B, journaled in the sides of my box X, incasing the gear and dynamo, which is preferably constructed as follows: The shaft B carries a spider D, provided with commutator-segments $e^2$, to which is secured the armature-ring D', within which are the segmental pole-pieces F' of the field F, which is bolted to the sides of my box or casing by pins $f$ and which is provided with a central aperture, through which the shaft B rotates.

I use in connection with my dynamo an automatic switch preferably constructed as follows: Keyed on the shaft B is a laterally-movable grooved ring G, attached to a concentric governor G', which is fastened to the side of my box or casing X. A lever H, suitably supported, as by a bracket H', is provided with an upper arm $h'$, which engages the grooves of the ring G, and the lower arms $h^4$ $h^3$ of the same serves to lift the brushes J J' from the commutator-segments $e^2$ in the following manner: When the grooved ring G moves to the left by an abnormal high speed of the dynamo, the upper arm $h'$ is engaged and the pivoted lever H is swung around, thereby causing the lower arm $h^3$ to rise and lift the brush J from the commutator. When, however, the speed of the dynamo becomes abnormally low, the grooved ring G is moved to the right a sufficient distance to engage the arm $h'$ of the said lever H, thereby causing the lower arm $h^4$ to rise and lift the brush J' from the commutator. I thus automatically open the dynamo-circuit, providing the speed of the dynamo gets either abnormally high or low.

The armature-ring D is wound with wire E, from which branch wires $e$ extend to the insulated segments $e^2$. The brush J is connected with one leg C of my circuit, and the other brush J' is connected with the other leg C' of the circuit. A derived or shunt circuit $C^2$ $C^4$ connects the wires C C' and is formed into a coil surrounding the field F. The other extremity of the wire C', running from the brush J', is connected with a magnetic switch, preferably constructed as follows: A vertical strap-spring L', provided with an armature-bar L², is secured to the side of the field and is constructed and arranged to make an electrical connection with the insulated platinum point L, from which the wire C³ runs to the storage battery M and lamps N. The wire C runs from the brush J, which engages the horizontal commutator, to the storage or secondary battery M and lamps N, which are arranged in parallel and which may be provided with cut-out switches N'.

It is manifest that various omissions of some particulars could be made without materially affecting the essential features of my invention or the operation of the remaining parts, and I do not therefore wish to be limited to the specific structural details of the organization herein set forth. Obviously the elements of the structure described may be located at an angle to the plane in which they are shown. I accordingly use the words "horizontal," "vertical," and the like in a relative sense.

In operation the movement of the vehicle causes the rotation of the shaft B by means of the intermediate gearing, and consequently the generation of the electric current is commenced, the circuit being through the field. As soon as the field becomes sufficiently magnetic the armature-bar L² is attracted and the wires C' and C³ are connected at the point L of said switch, and the output of the dynamo is carried by the wires C, C, and C³ to the storage battery and lamps. The shaft B may be actuated by the movement of the vehicle either by the use of an ordinary gear $a$ or inside gear-wheel $a^2$, attached to the wheel of the same.

In case the vehicle goes too fast or too slow the centrifugal governor G' will move the ring G and, by the engagement with the said grooved ring G of the upper arm $h'$ of a lever H, cause the lower arms $h^3$ $h^4$ to move upward and engage and lift a brush J or J' from the commutator, thereby opening the dynamo-circuit, the field becoming thereby demagnetized, and the magnetic switch automatically opens the main and circuit and prevents the storage-battery circuit from returning to the dynamo.

It is manifest by this construction that the lamps may be maintained at the normal candle-power either when the vehicle is standing still or when it is going slow, or else propelled at an abnormal rate of speed. This result I attain, as stated, by my combination, with a dynamo and storage battery, of my automatic, mechanical, and magnetic switches.

As it is evident that many changes in the construction and relative arrangement of parts might be resorted to without departing from the spirit and scope of my invention, I would have it understood that I do not restrict myself to the particular construction and arrangement of parts shown and described, but that I reserve the right to make such changes, and that—

What I claim as my invention is—

1. The combination, with a vehicle, of a dynamo actuated by the movement of the vehicle, of a secondary battery, and of a switch for directing the current to the secondary battery, consisting of an armature controlled by the field of the dynamo.

2. The combination, with a vehicle, of a dynamo actuated by the hub of the vehicle-wheel, of a secondary battery, and of a switch for directing the current to the secondary battery consisting of an armature controlled by the field of the dynamo.

3. The combination, with a vehicle, of a dynamo actuated by the movement of the vehicle, of a secondary battery, of a switch for directing the current to the secondary battery consisting of an armature controlled by the field of the dynamo, and of a switch for opening the circuit between the commutator and a brush of the dynamo, controlled by the said dynamo.

4. The combination, with a vehicle, of a dynamo actuated by the hub of the vehicle-wheel, of a secondary battery, of a switch for directing the current to the secondary battery consisting of an armature controlled by the field of the dynamo, and of a switch for opening the circuit between the commutator and a brush of the dynamo, controlled by the said dynamo.

5. The combination, with a vehicle, of a dynamo actuated by the movement of the vehicle, intermediate gearing of a secondary battery, a switch for directing the current to the secondary battery consisting of an armature controlled by the field of the dynamo, and a box for incasing the dynamo, switch and gearing.

6. The combination, with a vehicle, of a dynamo actuated by the movement of the vehicle, intermediate gearing of a secondary battery, and a switch for directing the current to the secondary battery consisting of an armature controlled by the field of the dynamo and also a box supported by the vehicle for incasing the dynamo and gearing and constructed and arranged to form bearings for the dynamo-shaft.

7. The combination, with a vehicle, of a dynamo actuated by the movement of the vehicle, of a secondary battery, and of a switch for directing the current to the secondary battery, consisting of an armature controlled by the field of the dynamo, the said dynamo consisting of a rotary ring armature carried by the commutator-shaft, and a stationary field provided with segmental pole-pieces.

8. The combination, with a vehicle, of a dynamo actuated by the movement of the vehicle, of a secondary battery, a switch for directing the current to the secondary battery consisting of an armature controlled by the field of the dynamo and a double-acting switch for opening the circuit between the commutator and a brush of the dynamo, actuated by the said dynamo either when running at an abnormal high or low speed.

9. The combination with a vehicle, of a box X, secured to the vehicle, a dynamo-shaft B, and gearing supported by and within the sides of the said box, a dynamo consisting of a rotary ring armature carried by the said shaft and a stationary field secured to a side of said box and provided with segmental pole-pieces, and of a switch for controlling the output of said dynamo consisting of an armature controlled by the field of said dynamo.

10. The combination, with a vehicle, of a dynamo actuated by the movement of the vehicle, of a secondary battery and a double-acting switch consisting of the centrifugal governor $G'$, grooved ring G, arms $h'$, $h^3$, $h^4$, lever H, for opening the circuit between the commutator and the brushes J, $J'$, of the dynamo actuated by the said dynamo either when running at an abnormal high or low speed, and of another switch also controlled by the dynamo for directing the current to the secondary battery.

11. In a dynamo a rotary ring armature $D'$, carried by a spider D, the shaft B, of which carries a commutator and passes through a field-magnet F, in combination with a stationary concentric field provided with segmental pole-pieces F, $F'$, located within said ring armature, and provided with supporting devices, as pins $f$, and of a switch consisting of an armature controlled by said field.

In testimony of the foregoing specification I do hereby sign the same, in the city of New York, county and State of New York, this 30th day of December, A. D. 1896.

FREDERICK M. BENNETT.

Witnesses:
J. ODELL FOWLER, Jr.,
FRED P. SCHUBEL.